United States Patent [19]

Bosund et al.

[11] 4,091,003
[45] May 23, 1978

[54] FISH PROTEIN ISOLATE

[75] Inventors: Sven Ingmar Walton Bosund, Helsingborg; Bengt Lennart Bengtsson, Bjuv; Karl Bertil Lennart Ostman, Kagerod, all of Sweden

[73] Assignee: Societe d'Assistance Technique Pour Produits Nestle S.A., Lausanne, Switzerland

[21] Appl. No.: 362,341

[22] Filed: May 21, 1973

[30] Foreign Application Priority Data

May 22, 1972 United Kingdom .............. 23933/72

[51] Int. Cl.$^2$ ............................................. A23J 1/04
[52] U.S. Cl. ................................ 260/112 R; 426/271; 426/657
[58] Field of Search ............... 426/149, 212, 271, 364, 426/376, 429, 495, 643, 657, 7, 437; 260/112 R

[56] References Cited

U.S. PATENT DOCUMENTS

| | | | |
|---|---|---|---|
| 3,252,962 | 5/1966 | Whaley et al. | 426/332 X |
| 3,798,126 | 3/1974 | Gasser et al. | 426/364 X |

Primary Examiner—Raymond N. Jones
Assistant Examiner—R. A. Yoncoskie
Attorney, Agent, or Firm—Watson, Leavenworth, Kelton & Taggart

[57] ABSTRACT

A process for preparing a protein isolate from fish material is described, in which a fish material having a lipid content not exceeding 0.5% by weight is treated with aqueous alkali at a pH of 10 to 12, at a temperature of 80° to 100° C for a period of time of 1 to 5 minutes, insoluble material is removed from the alkali solution, and thereafter the solution is desalted and deodorized.

2 Claims, No Drawings

FISH PROTEIN ISOLATE

The present invention is concerned with a process for solubilization and purification of protein from fish raw materials, to provide a taste- and odor-free water-soluble fish protein isolate with a high nutritional value.

Several methods have been devised for making a bland fish protein concentrate with a high nutritional value. With virtually all raw materials used for making such a concentrate removal of lipids is a necessity in order to ensure a bland product with sufficient stability. Generally, 0.5% by weight residual lipids in the concentrate calculated on dry matter basis, is considered as amaximum level. Solvent extraction is the normal way for such a nearly complete removal of lipids. Some of these methods have been technically adequate but none has been commercially successful due to the lack of functional properties of the resulting protein concentrate. Such functional properties include water-solubility, foaming ability, emulsifying ability and water binding capacity. A protein lacking such functional properties can only be used for protein enrichment, since it adds nutritional value, but is inert in all other respects. Furthermore, its use for protein enrichment is limited to certain types of foods such as bread in which water-solubility is not necessary. Among the functional properties that might be desirable for different uses water-solubility is the most important since it opens up broad areas for applications to all types of foods. Water-solubility is in addition a necessary condition for most of the other functional properties.

With this background, several methods have been suggested based on enzymatic hydrolysis as a means of imparting water-solubility to the fish proteins. Although being effective in this respect such methods are frequently difficult to control on an industrial scale due to variations both in the activity of the inherent fish tissue enzymes and in the activity of commercially available enzyme preparations. In addition they are relatively uneconomical since no method for recovery of the added enzymes have so far been devised.

A further possibility is alkali solubilization, but this involves the risk of destruction of sulphur-containing amino acids thereby reducing the nutritional value. A further difficulty is the frequent formation of undesirable flavors and the release of already present flavor compounds during the solubilization. This difficulty, together with the need for an efficient desalting process has up to now prevented the use of alkali solubilization for making a water-soluble fish protein product.

Alkali solubilization applied directly to the fish raw material, prior to the necessary solvent extraction of the lipids, has definite disadvantages in that no stable intermediate product is formed which means that the complete process has to be carried out at the same location.

An object of the present invention is to provide a simple, economical process for preparing a water-soluble protein isolate from fish.

The present invention thus provides a process for preparing a protein isolate from fish material, in which a fish material having a lipid content in dry matter not exceeding 0.5% by weight is treated with aqueous alkali at a pH of 10 to 12, at a temperature of 80° to 100° C for a period of time of 1 to 5 minutes, insoluble material is removed from the alkali solution, and thereafter the solution is desalted and deodorized.

The protein isolate obtained by the process of the invention is virtually taste- and odor-free, and has a high nutritional value, at least equal to casein. It is more specifically characterized by having a protein content between 90 and 98%, a lipid content below 0.5% and an ash content between 1 and 10% on dry matter basis.

The starting material for the process is preferably fish solids from which the lipids have been removed to the indicated degree, as for example by extraction with a solvent such as isopropanol. Solvent extraction provides a stable intermediate product, comprising a mixture of fish solids and residual solvents, which is chemically and bacteriologically stable over extended periods of time. This means that the removal of lipids may be carried out at sea and the subsequent processing of the intermediate product on land. Furthermore, the oil obtained directly is of higher quality than oil extracted from fish which has first been treated for example with alkali, and in addition low-molecular, nitrogen-containing substances, of poor nutritional value, are also removed with the solvent.

The fish material may be obtained, for example, from any one of the following:

(1) degutted lean fish such as cod, haddock or hake (2) filleting by-products from frozen fish factories such as V-cuts, which is a part of the fillets normally discarded due to the presence of small bones, and (3) whole fish of pelagic species such as anchovetas, sardines, etc.

The actual method of preparation of the fish starting material is relatively unimportant, provided that it has no more than 0.5% by weight of lipids on a dry matter basis.

Treatment of the fish material with alkali is carried out under controlled conditions of pH, time and temperature so that destruction of the most sensitive amino acids, notably cystein, lysine and methionine is insignificant. Whilst sodium hydroxide is the preferred alkali, as it dissolves the protein rapidly, other alkalis may however be used provided that the positively-charged ions are capable of being removed during the subsequent desalting process described here. The alkali treatment is preferably carried out on a suspension containing 5 to 10% by weight of fish dry matter, and under the conditions herein defined it is possible to dissolve from 80 to 95% of the fish protein without any damage to the nutritional value of the protein. The actual degree of solubilization will however depend on the fish raw material.

After alkali treatment the suspension may be cooled, for example to 50° to 60° C and insoluble matter, including undissolved protein and solid fractions such as bones removed, e.g., by filtration, pressing or centrifugation. The preferred method is continuous centrifugation, as this may be effected rapidly, resulting in a clear protein solution and in an undissolved bone and protein fraction rich in minerals. Alkali solubilization as described permits removal of virtually all the bones, so that the fluoride content of the final protein product is very low. This bone protein fraction is preferably dried separately and used as a fodder.

The clarified protein solution is then desalted. Whilst theoretically this operation can be effected by ultrafiltration, it is technically impractical as presently available membranes are sensitive to high pH values. Electrodialysis is an alternative, but has the disadvantage of giving rise to precipitation, which decreases the capacity of the cells. Ion exchange in columns is the most acceptable principle but this can also give rise to the formation of precipitates when the drop in pH is large, which inhibits the performance of the columns. It is accordingly preferred to carry out the desalting by exchange of the positively charged ions by ammonium ions, as described and claimed in our copending application No. 13,086/72. The ammonium ions are subsequently completely removed in the steam-stripping.

This application (No. 13,086/72) describes an efficient process for desalting alkaline protein solutions, the term "desalting" being used to designate the removal of cations other than $H^+$. The resulting protein products are characterized by a low ash content, generally below 5% in the case of protein isolates. The ash content may however vary with the origin of the protein.

This process for desalting alkaline protein solution comprises exchanging the cations present in the solution for ammonium ions by contacting the solution with a cation exchange resin in ammonium form, and eliminating the ammonium ions from the solution by vaporization as ammonia. By "vaporization" is meant that the ammonium ions are eliminated from the solution as ammonia gas, which may be effected, for example, by stripping (with steam or under reduced pressure) or by evaporation.

The cation exchange resin may be either a strongly acidic or weakly acidic resin of the gel type. Macroreticular resins, having a pore size of 30 A or more, are particularly preferred by reason of their long operating life. The resin treatment may be effected at any convenient temperature between 0° and 100° C, the range of 50° to 80° C being preferred, as at these temperature the viscosity of highly concentrated protein solutions is lower, whilst breakdown of the protein is still insignificant.

In order to eliminate the ammonium ions from the protein solution, a specific vaporisation step is frequently unnecessary if the protein is recovered in dry form. In such cases, after ion exchange treatment the solution is normally concentrated by evaporation at temperatures of 50° to 90° C resulting in volatilization of ammonia and any residual traces are removed by the heat supplied for drying (e.g., spray-, roller- or vacuum drying).

For economic reasons it is desirable to recover the ammonia liberated during the heating steps, for example by condensation of the evolved vapours. The resulting aqueous ammonia solution may, after addition of acid to pH 10.0 or lower, be used for regeneration of the ion exchange resin.

The desalting procedure described herein may be applied to alkaline solutions of proteins of various origins, and particularly to fish, vegetable (e.g., soy or other oilseed proteins), microorganism (yeast or bacteria) and milk proteins. The protein content of the solution to be treated may vary within wide limits, the upper limit being generally imposed by the viscosity of the solution. Thus, the dry matter content of untreated protein solutions will normally lie within the limits 2 to 10% by weight, as above 10% the viscosity of the solution impedes satisfactory ion-exchange treatment, and it is usually uneconomic to treat very dilute solutions with protein contents below about 2%. On the other hand, solutions of proteins which have been partially degraded, for example enzymatically, may have a dry matter content of up to about 20% by weight. The pH of the protein solution is preferably in the range 9.5 to 12.5, since at pH values below about 9.5 the efficiency of alkali solubilization decreases, whilst strongly alkaline conditions are detrimental to the nutritional value of the protein.

In a preferred embodiment of the ion exchange treatment, a strong cation exchange resin, regenerated by an ammonium salt, is used. It is especially favorable to use a macroreticular resin, e.g., Amberlite 200 due to its long life. The concentration of the regenerating salt solution may be from 0.1 to 5.0 N but the preferred concentration is 1.0 N. The temperature of the treated liquid is not critical but it is favourable to use a temperature of 50° to 80° C in order to reduce the viscosity of the protein solution in the column, as the dissolved proteins have the initial high molecular weight of the raw material resulting in a protein solution with high viscosity.

Whilst for certain applications, proteins giving high viscosities in water solutions are required, when a high viscosity is not necessary it is then desirable to reduce the molecular weight of the proteins, particularly by treatment with a proteolytic enzyme, so that the protein solution may be concentrated to a higher dry matter content prior to drying. The enzyme treatment should be mild enough not to change appreciably the properties of the protein other than the viscosity in solution. The enzyme used should preferably have good activity at alkaline pH values, especially in the range 8 to 10. The preferred enzymes are trypsin and bacterial proteases. The amount of enzyme needed is very small, for example 0.1 to 1.0 g per kg of protein dry matter treated. The treatment as stated is very mild, and should desirably be completed within 5 to 30 minutes. Thereafter the residual enzyme is inactivated by heat treatment, e.g., at 60° to 90° C for 5 minutes.

After desalting and enzyme treatment, if this latter is applied, the protein is deodorized, preferably by steam-stripping, in order to remove all undesirable volatiles from the protein solution. These include, as previously stated, ammonium ions, flavor components formed or released in the alkali solubilization step and any residual solvent from petreatments such as lipid extraction. The conditions applied are selected having regard to these objectives. The stripping is preferably carried out in a packed column, with the steam entering at the bottom and the protein solution at the top, resulting in a countercurrent contact between the steam and protein solution. In general, from 0.1 to 1.0 kg of steam (at atmospheric pressure) is used per kg of protein solution. The steam leaving the column contains the various volatiles noted above, and may be condensed. The condensate may then be acidified to pH 4.5 and treated for recovery of solvent residues, whereas ammonia and volatile amines remain in the water phase and are discarded.

As the preferred steam-stripping treatment is very effective for the removal of volatiles from the protein solution, additional treatment with adsorbents such as active carbon or resin, or with chemical agents such as hydrogen peroxide are generally unnecessary. However, such treatments, if applied, may be carried out before or after the steam-stripping. Hydrogen peroxide is capable of oxidising minor traces of flavour compounds, and also bleaches the protein which may be advantageous when fatty fish with dark flesh is used as a raw material.

After the stripping, the protein may be dried to provide a final product with a moisture content low enough for stability. Prior concentration, as by reverse osmosis, freeze concentration or thermal evaporation is desirable to reduce the load on drying facilities. The method preferred according to the invention is evaporation, and if an enzymatic treatment has been applied, the protein solution may be concentrated to between 25 to 50% dry weight.

Drying may be carried out by a roller, spray- or foam drier or any other conventional drier. The drying is carried out preferably in a spray-drier at relatively low temperatures in order to avoid heat damage to the protein which would be detrimental to the nutritional value and functional properties.

The dried product is light-colored and bland in flavor and odor. It has a high protein content, between 90 and 98% on dry weight. The product has a high nutritional value and is especially rich in available lysine, ranging from 7.0 to 9.0 g per 16 g N, depending on the raw material. The protein efficiency ratio (PER) is typically in the range 3.0 to 3.5, at least equal to that of casein as determined under identical conditions. The fat content is 0.05 to 0.5% on dry weight and the ash content between 1 and 10%. As the bones were removed prior to alkali dissolution, the fluoride content is low, below 25 ppm. The water-solubility of the final powder, expressed by the Nitrogen Solubility Index (determined according to the American Oil Chemists' Society Official Method Ba 11-65) lies in the range 80 to 100. By virtue of its properties, the protein isolate may be used in a wide range of foods, including sausages, meat replacements, soups, sauces, bouillons, cereals, ice-cream, milk, desserts and the like.

The following examples are given by way of illustration only. The percentages are by weight.

EXAMPLE 1

1000 kg of whole herring are ground in a meat grinder and then mixed with 1500 kg of isopropanol. The slurry is stirred for 5 minutes at room temperature and the solids are then separated from the isopropanol in a centrifuge. The lipid extraction as described is repeated four further times. This treatment results in 400 kg of extracted fish mass containing 50% dry weight and 50% isopropanol. The solvent used for extraction is recovered by distillation and the fat fraction is separated. The 400 kg of extracted fish are mixed with 1600 kg of water and the slurry is homogenized. The slurry is then continuously mixed with sodium hydroxide to give a pH of 12 and heated to 80° C by steam injection. Immediately after alkali addition and steam injection the slurry is pumped through holding tubes with a residence time of 2 minutes and thereafter cooled to 50° C. The bones and other insolubles are separated on a vibrating screen and the protein solution is clarified by centrifugation.

The clear protein solution is pumped through a cation exchange resin column in which sodium ions are exchanged by ammonium ions, and 1800 kg solution containing 6.5% dry matter are collected from the column. 20 g of trypsin are added to the solution and the temperature is maintained at 40° C for 30 minutes. 1 kg of 35% hydrogen peroxide is then added and the temperature is raised to 70° C for 30 minutes in order to inactivate the enzyme and to bleach the protein. The bleached solution is pumped into a stripping column, in which each kg of protein solution is contacted countercurrent with 0.5 kg of steam at 100° C, and the stripped solution is cooled to 60° C. The resulting protein solution is bland in flavor, it is concentrated by evaporation to a dry matter content at 40%, and spray-dried to a moisture content of 5.0%. The product has a protein content of 91.8%, and ash content of 8.0, and a lipids content of 0.2%. The fluoride and isopropanol are both below 25 ppm.

EXAMPLE 2

1000 kg of cod filleting waste are ground in a meat grinder and then extracted in a screw extractor with isopropanol. The fish is fed into the lower end of the extractor and the isopropanol into the upper end, providing a countercurrent contact between the fish and the solvent. 1500 kg of isopropanol are used for the extraction of the 1000 kg of fish. The extracted fish mass, containing about 50% dry matter and 50% of isopropanol, continuously leaving the top of the screw is then mixed with water to give a slurry containing 10% dry matter. This slurry is pumped through a homogenizer, potassium hydroxide is added to pH 11.0 and it is heated to 100° C by direct steam injection. The hot alkaline slurry is passed through holding tubes with a residence time of 1 minute and immediately on leaving the tubes is passed to a decanter centrifuged where the bones and undissolved protein are separated.

The clear protein solution is cooled to 80° C and pumped through a cation exchange resin column in which potassium is exchanged by ammonium. Thereafter the solution is steam-stripped, concentrated in an evaporator to 20% dry matter and spray-dried.

The dried product has a bland flavor and the following composition:
Protein: 97.0%
Ash: 2.6
Lipids: 0.4

EXAMPLE 3

15 kg of dried fish protein concentrate are mixed with 200 liters of water to provide a homogeneous slurry. The slurry is then continuously heated to 100° C in a tube heater and 2.5 N sodium hydroxide solution is continuously added to give an alkali concentration of 0.1 N. The slurry is passed through a holding tube with a residence time of 5 minutes and is then cooled to 60° C. After cooling, undissolved material is removed in a clarifying centrifuge. The resulting clear protein solution has a pH value of 12.0 and a dry matter content of 6.7%.

The solution is passed at a rate of 200 liters/hour through an ion exchange resin column containing 20 liters of Amberlite 200 cation exchange resin, previously regenerated with three bed volumes of 5% ammonium sulphate solution. The protein solution leaving the column has a pH value of 9.8 and contains 6.6% dry matter. The protein solution is then concentrated in an evaporator in a single step to 20% dry weight, with simultaneous elimination of the ammonia present. The concentrated solution, now having a pH value of 7.5, is spray-dried. The ash content of the dry product is 3%.

The resulting dried protein has a NSI value (Nitrogen Solubility Index, as determined by the American Oil Chemists' Society Official Method Ba 11-65) of about 95. For comparison, the NSI value for conventionally processed protein isolate was determined and found to be 75. The protein efficiency ratio (PER) has also been determined on the dried protein and found to be 3.2. Casein tested at the same time showed a value of 3.0.

EXAMPLE 4

250 kg of whole cod are ground in a meat grinder and then mixed with 250 liters of 0.08 N sodium hydroxide. The mixture is heated to 70° C, homogenized in a Fryma mill and maintained at this temperature for 2 hours. Bones and other insoluble matter are then removed and a protein solution containing 10.2% dry matter and having a pH value of 11.0 is recovered.

The protein solution is passed at a rate of 1000 liters/hour through an ion exchange resin column containing 50 liters of Amberlite 200 cation exchange resin regenerated with two bed volumes of 5% ammonium chloride solution. The solution leaving the column contains 9.8% dry matter and has a pH value of 9.3. It is then concentrated and dried as described in Example 3. The ash content of the dry protein is 4.5%.

EXAMPLE 5

20 kg of insoluble lactalbumin are mixed with 200 liters of water to provide a homogeneous slurry. The slurry is then continuously heated to 100° C in a tube heater and sodium hydroxide is continuously added to give an alkali concentration of 0.08 N. The slurry is passed through a holding tube with a residence time of 1 minute, cooled to 60° and clarified in a centrifuge. The resulting protein solution has a pH value of 11.5 and a dry matter content of 9.2%. The solubilised protein solution is then passed as a rate of 400 liters/hour through an ion exchange resin column containing 20 liters of Amberlite 200 regenerated with three bed volumes of ammonium carbonate solution. The solution leaving the column contains 9.0% dry matter and has a pH value of 9.5. It is then concentrated and dried as described in Example 3. The dry material has an ash content of 2%.

EXAMPLE 6

20 kg of hexane-extracted soy flour are mixed with 200 liters of 0.03 M solution of calcium hydroxide and agitated for 30 minutes at 55° C. The insoluble matter is removed in a filter press and a clear protein solution containing 8.0% dry matter and having a pH value of 9.5 is recovered.

The protein solution is passed through an ion exchange resin column as described in Example 3. The protein solution leaving the column has a pH value of 9.0 and contains 7.8% dry matter. It is then concentrated by ultrafiltration to separate the low molecular carbohydrates from the proteins, and the concentrated, purified protein solution is spray-dried. The dry material has an ash content of 3%.

EXAMPLE 7

20 kg of dried yeast are mixed with 200 liters of water to provide a homogeneous slurry. The slurry is then continuously heated to 90° C in a tube heater and potassium hydroxide is continuously added to give an alkali concentration of 0.06 N. The slurry is passed through a holding tube with a residence time of 2 minutes, cooled to 50° C and clarified by vacuum filtration. The resulting protein solution has a pH value of 11.5 and a dry matter content of 9.8%.

The protein solution is passed through an ion exchange resin column as described in Example 3. The protein solution leaving the column has a pH value of 9.5 and contains 9.5% dry matter, and it is concentrated by ultrafiltration to separate the low molecular carbohydrates and the degraded nucleic acids from the proteins. The concentrated purified protein solution is then spray-dried. The dry product has an ash content of 1.5%.

What we claim is:

1. A process for preparing a protein isolate from fish material having a lipid content not exceeding 0.5% by weight, comprising treating said fish material with aqueous alkali at a pH of 10 to 12 and a temperature of 80° to 100° C. for a period of time of 1 to 5 minutes, removing insoluble material from the alkali solution, and thereafter desalting and deodorizing the solution, desalting of said alkali solution being accomplished by exchange of ammonium ions for cations present in said solution, followed by removal of ammonium ions from the solution by vaporization as ammonia.

2. Process according to claim 1, in which said ion exchange is effected at a temperature of 50° to 80° C.

* * * * *